Dec. 14, 1943.   D. R. BERLIN   2,336,772
ENGINE COOLING MEANS
Filed Dec. 23, 1940   2 Sheets-Sheet 1

INVENTOR
DONOVAN R. BERLIN.
BY
ATTORNEY

Dec. 14, 1943.            D. R. BERLIN            2,336,772
                      ENGINE COOLING MEANS
                      Filed Dec. 23, 1940            2 Sheets-Sheet 2

INVENTOR
DONOVAN R. BERLIN.
BY
ATTORNEY

Patented Dec. 14, 1943

2,336,772

UNITED STATES PATENT OFFICE 2,336,772

ENGINE COOLING MEANS

Donovan R. Berlin, Eggertsville, N. Y., assignor to Curtiss-Wright Corporation, a corporation of Delaware Application December 23, 1940, Serial No. 371,342

3 Claims. (Cl. 123—171)

This invention relates to cooling systems for air-cooled engines and is particularly concerned with a cooling system for a wholly enclosed radial cylinder air-cooled engine.

An object of the invention is to provide a cooling air intake and manifolding arrangement particularly adapted for engines which are completely housed within a cowling or aircraft body, the manifold being so constructed that the several cylinders of the engine all are cooled to the same extent.

A further object is to provide a combined manifold and baffling system for an engine having a number of air-cooled cylinders, the system being so constructed that all cylinders receive substantially the same amount of cooling air and furthermore, that the cooling air conducted to each cylinder is directed over substantially the entire surface of the cylinder. Another object is to provide means for cooling the individual cylinders of an engine having multiple rows of cylinders radially arranged and wholly submerged within an engine body.

Still another object is to provide a combined air duct and baffling system for a multi row radial cylinder engine.

Further objects will become apparent in connection with the annexed description taken with the drawings, in which.

Figure 1:
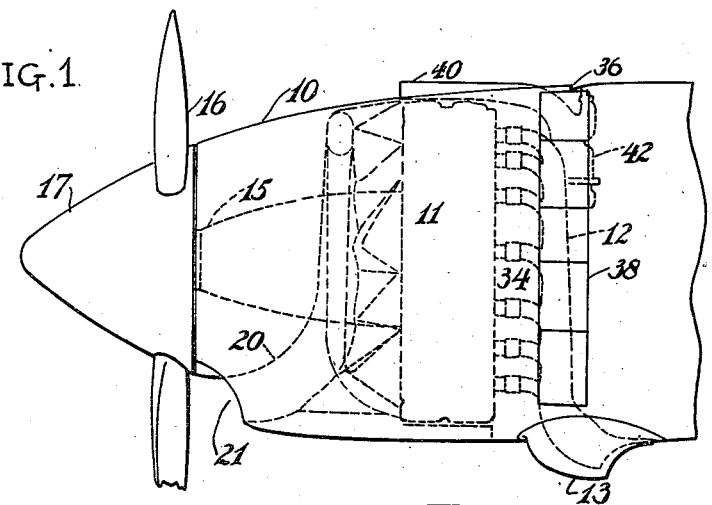
Fig. 1 is a side elevation of the forward portion of an aircraft body, showing the disposition of the engine and cooling system therein, in dotted lines.

An aircraft body of streamlined form is shown at 10, this body comprising either an aircraft fuselage or nacelle within which is mounted a multi cylinder radial air-cooled engine 11 having a rearward exhaust manifold 12 discharging through a faired extension 13 at the bottom of the body. The front end of the engine carries an elongated extension 15 through which the engine propeller shaft extends and on the front end of which is secured a propeller 16 having a spinner 17 forming a forward streamlined continuation of the body 10. In this arrangement the engine proper is disposed a considerable distance rearwardly of the front end of the body whereby the cowling portion forward thereof along with the spinner 17 may be designed with a smooth tapered streamlined form by which the drag of the body under high speed flight conditions is materially improved over that prior practice wherein the engine was disposed substantially at the front end of the body.

Figure 2:
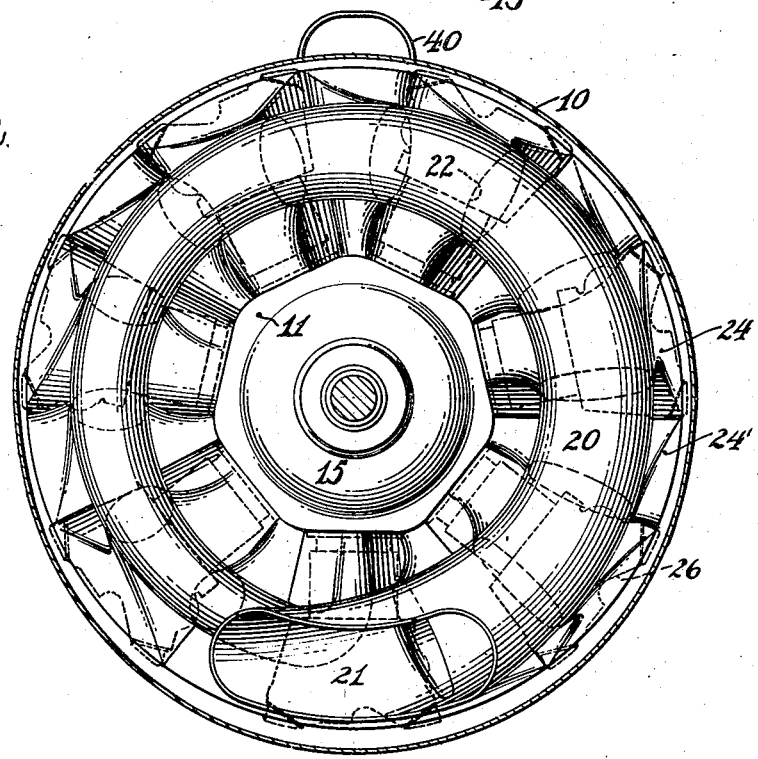
Fig. 2 is a section, looking toward the front of the engine and showing the cooling manifold and ducts.
Figure 3:
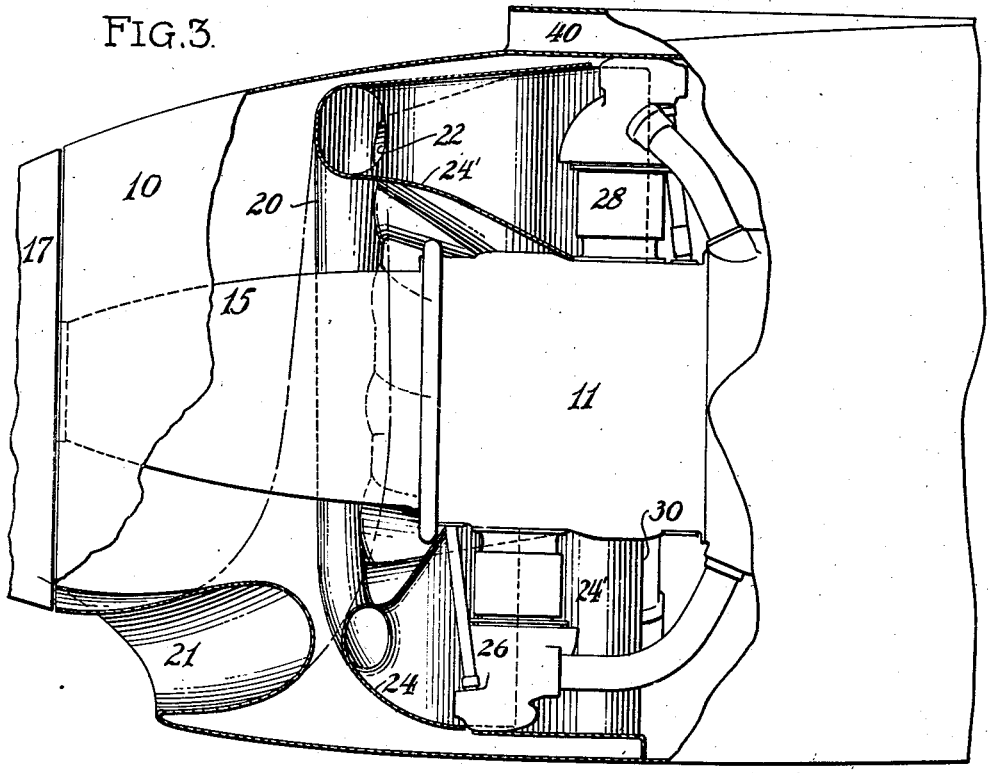
Fig. 3 is an enlarged fragmentary section through a portion of Fig. 1, showing the duct and manifold system and its relationship to the engine and body.

It will be noted that a considerable distance exists between the rear of the spinner and the front face of the engine and within this space a cooling air manifold 20 is located, the manifold terminating at its forward open end in an air scoop 21 immediately behind the propeller. The manifold is formed as a tapered tube, the large end of the tube lying at the air entrance opening 21 whence the tube curves from a fore-and-aft direction to a direction wherein its axis is substantially parallel to the plane or planes in which the engine cylinder axes lie. As is clear from Fig. 2, the tube is of parti-annular form, passing ahead of the several engine cylinders and lying intermediate the cylinder heads and the cylinder bases, the tube thus embracing the extended engine nose 15 and lying within the space rearward of the spinner 17 and ahead of the engine 11.

Figure 4:
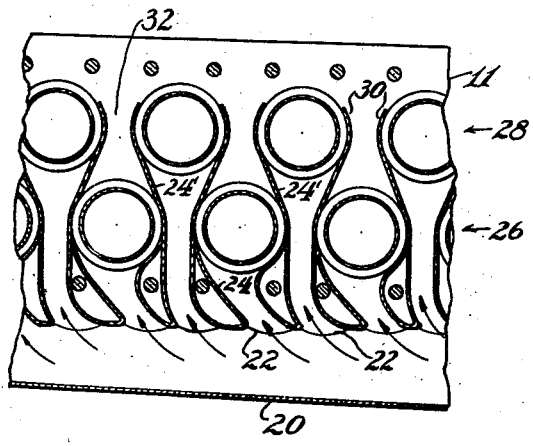
Fig. 4 is a developed sectional plan of a plurality of engine cylinders and the cooling manifold and ducts.

The tube 20 along its rearward wall is provided with a plurality of openings 22 and rearwardly extending ducts 24 and 24' are secured to the manifold 20 adjacent the edges of the openings, these ducts being equal in number to the number of engine cylinders and each one being directed toward one engine cylinder for directing cooling air thereover. As in Fig. 4, the particular showing of the invention illustrates a two-row radial cylinder engine wherein the cylinders of the forward row designated 26 are cooled by air passing through the ducts 24, while the cylinders of the rearward row 28 are cooled by the ducts 24' which pass between the cylinders of the row 26 to embrace the cylinders of the rearward row 28. The walls of the ducts 24' embrace the cylinders of the row 28 as at 30 so that air passing through the ducts 24' impinges on the front sides of the cylinders of the rear row and is thereafter confined closely to the surfaces thereof. The outer surfaces of the ducts 24', as the ducts pass between the cylinders of the front row, serve to confine cooling air delivered by the ducts 24 to the finned peripheries of the front row of cylinders and these outer surfaces also define exit air ducts 32 between the cylinders of the row 28 through which cooling air leaving the cylinders of the front row passes to a chamber rearward of the engine, such chamber being indicated at 34 in Fig. 1. This chamber is scavenged of spent cooling air through a suitable air exit slot 36 which may be provided with adjustable flaps 38.

In the drawings, I also show an airscoop 40 which leads to the engine carburetor, indicated at 42, this airscoop lying without the surface of the body 10.

It will be apparent that although I have shown the invention as adapted to a multi row engine, the teachings of the invention may be used with equally good effect with single row engines or with engines of other than radial type. It is contemplated that the taper of the tube or manifold 20 be of such degree that each of the cylinder ducts 24 and 24' will receive an equal amount of cooling air under substantially identical velocity and pressure conditions whereby each of the several cylinders of the engine may be cooled to the same degree. Equal cylinder cooling is an extremely important factor in successful operation of air-cooled engines for overheating of one or more cylinders will tend to limit the power developed by the engine. A manifolding system properly designed according to the teachings of the invention holds promise of yielding more uniform cooling air distribution to the engine cylinders than has heretofore been obtained in systems where a large pressure air reservoir is set up ahead of the engine without adequate means for establishing uniformity of flow to the several engine cylinders. In this connection, in the older systems, a high degree of turbulence existed in the cooling air stream which tended to prevent the passage of air between the cylinder fins in a manner which was capable of accurate evaluation. With a manifold system as herein disclosed, it is believed that the cooling problem may be more accurately evaluated in advance so that more successful engine cooling may be expected when the system is subjected to operation.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an aircraft power plant comprising an enclosed radial cylinder air-cooled engine, a tapered cooling air manifold having its large end curved forwardly and open to the outside air, the manifold being curved around the engine and lying on one side of the engine cylinders, a portion of the manifold lying opposite each cylinder, and a plurality of conduits open at their forward ends to the manifold and open at their other ends to the surfaces of respective cylinders, each said conduit being formed to embrace substantially the forward portion of its cylinder to confine the cooling airflow to the cylinder surface and to discharge the air rearwardly from the cylinder.

2. In a cooling system for a radial cylinder air-cooled engine enclosed within a cowling, an air duct for each engine cylinder embracing substantially the forward portion thereof, said ducts extending forwardly from the forward face of the engine, and means for uniformly distributing cooling air to the several ducts comprising an annular tapered manifold connected thereto, said manifold terminating at its larger end in a forwardly facing air intake opening in said cowling.

3. A cooling manifold for a two row radial cylinder air-cooled engine comprising a partiannular tube tapered from one end to the other, the larger end being curved from the central plane to comprise an air scoop, a plurality of conduits spaced along the manifold and communicating therewith and flaring outwardly at their free ends to embrace the front portions of the cylinders of the nearest row, and a second plurality of conduits, alternating with the first plurality, communicating with the manifold and extending between the cylinders of the nearest row, said latter conduits being formed to embrace a substantial portion of the cylinders of the remote row to direct cooling air to the cylinder surfaces, and the outer walls of said latter conduits likewise lying close to the cylinders of the near row to confine the air flowing thereover to the surfaces thereof.

DONOVAN R. BERLIN.